UNITED STATES PATENT OFFICE.

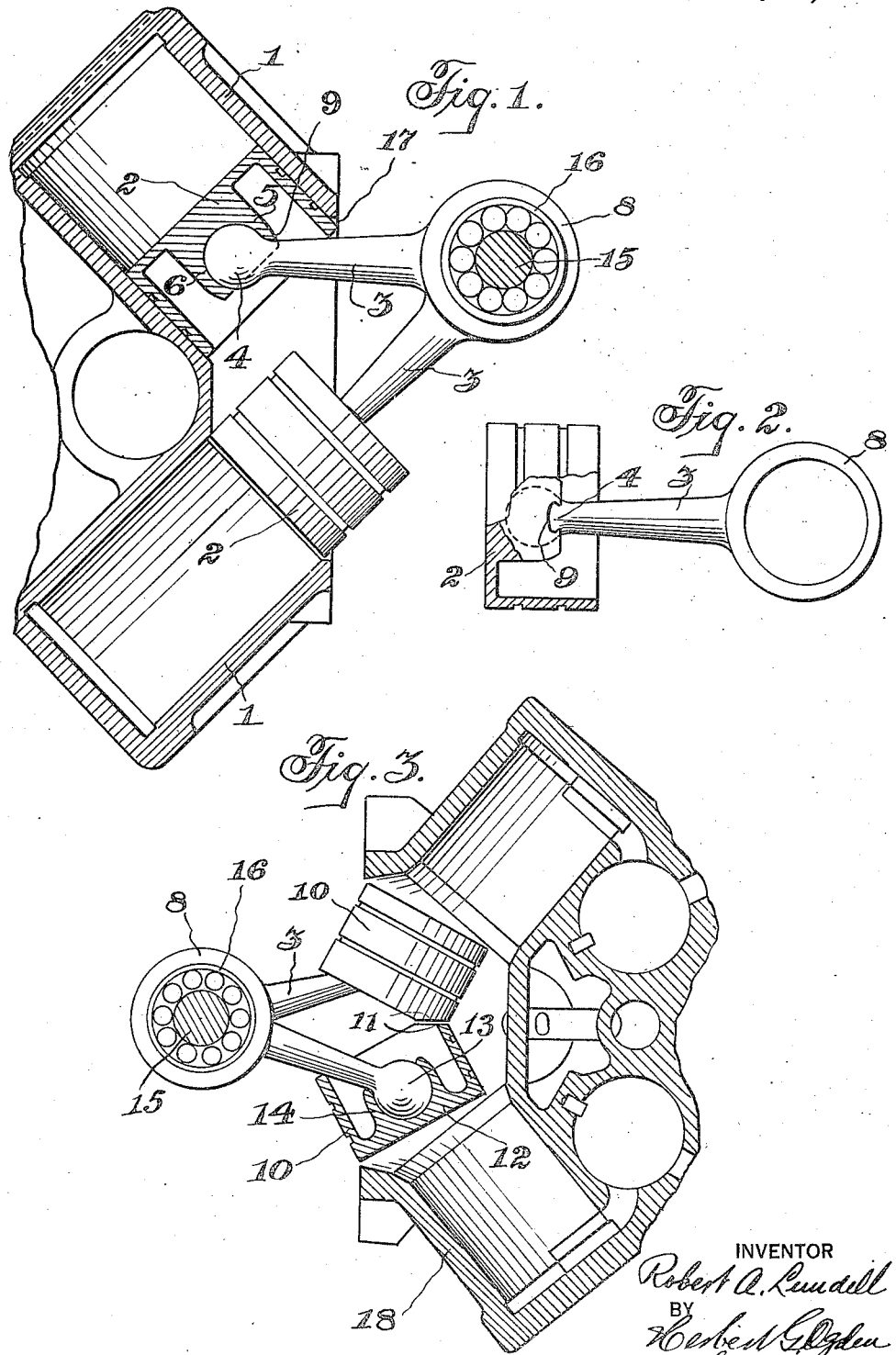

ROBERT A. LUNDELL, OF NEW YORK, N. Y., ASSIGNOR TO INGERSOLL-RAND COMPANY, OF JERSEY CITY, NEW JERSEY, A CORPORATION OF NEW JERSEY.

PISTON AND CONNECTING ROD CONSTRUCTION.

1,423,343.           Specification of Letters Patent.      Patented July 18, 1922.

Original application filed April 18, 1918, Serial No. 229,306. Patent No. 1,371,701, dated March 15, 1921. Divided and this application filed October 23, 1920. Serial No. 418,889.

*To all whom it may concern:*

Be it known that I, ROBERT A. LUNDELL, a citizen of the United States, and a resident of the borough of Manhattan, city, county, and State of New York, have invented certain new and useful Improvements in Piston and Connecting Rod Construction, of which the following is a specification accompanied by drawings.

This invention relates to engines, but more particularly to multiple cylinder V-type engines adapted to be operated by fluid under pressure as compressed air, for high speed rotating tools or machines.

This application is a division of my copending application, Serial No. 229,306, filed April 18, 1918, for "Piston and connecting rod construction."

In an engine of this type, the cylinders are ordinarily located at equal acute angles on opposite sides of a plane passing through the axis of the crank shaft, and the axes of the cylinders form an angle of approximately 90 degrees in practice, although this angle may be more or less than that, and between about 30 degrees and about 120 degrees as desired.

The usual method of assembling the pistons in the cylinders is to first insert the pistons and connecting rods into the cylinders, before assembling the connecting rods on the crank pin or pins of the crank shaft, necessitating some form of split or open connecting rod end, which in the limited space of small engines cannot be made as substantial and durable as a closed end one piece connecting rod, as shown in the present instance. Particularly in small engines, difficulties are experienced in so assembling the parts, owing to the confined space in which to adjust the bearings and other parts, after the pistons and connecting rods are in position in the cylinders.

The primary object of the present invention is to obviate these and other disadvantages of such methods of assembly known to those skilled in the art, by forming the crank shaft, connecting rods and pistons as a single unit with provision for permitting the pistons to be inserted in the cylinders longitudinally after the connecting rods have first been assembled in the pistons and on the same crank pin. By this means all the adjustments on the pistons and crank pin are conviently made on the bench before the pistons are placed in the cylinders, and furthermore the connecting rods may be provided with continuous bearing rings adapted to be slipped over the crank endwise instead of the usual split bearing sleeves or rings which are required in the usual methods.

The invention is illustrated in the accompanying drawings in which—

Figure 1 is a longitudinal sectional view through two cylinders of a V-type engine, but transverse to the axis of the crank shaft;

Figure 2 is a detail view of a piston and connecting rod, and

Figure 3 is a view similar to Figure 1 of a modification.

Referring to the drawings, the cylinders 1 are arranged in the cylinder body with their axes at an angle of about 90 degrees in the present instance, and said cylinders as shown are located at equal acute angles on opposite sides of a plane passing through the axis of the crank, the crank pin 15 being indicated in section.

Suitable pistons 2 are adapted to operate in the cylinders and connecting rods 3 are suitably pivoted to said pistons and in accordance with this invention are adapted to be assembled on the same crank pin 15 before inserting the pistons 2 into the cylinders.

As shown in this instance, the connecting rods 3 are provided with balls 4 at one end pivotally held within the sockets 6 formed in the portions 5 of the pistons the edges of the sockets being crimped or formed over to hold the balls. The crank ends of the connecting rods 3 are preferably formed with continuous rings 8 adapted to be slipped over the bearing sleeves 16 in assembling the unitary structure comprising the pistons, connecting rods and crank.

In order to afford provision for assembling the pistons in the machine after the connecting rods have been connected to the same crank pin 15 in one form of the invention, portions of the ball sockets 6 are cut away as indicated at 9 to allow one connecting rod 3 to rock over until it touches or nearly touches the outer rim of the piston as indicated at the point 17 in Figure 1. This construction permits the opposite piston 2 to swing past the edge of the cylinder casting and enter its piston bore. In Figure 1 the pistons are shown in the positions they assume as they are being assembled in the cylinders, from which it will be apparent that the connecting rods 3 have been adjusted at an angle less than the angle between the axes of the cylinders. Such adjustment is permitted because of the cutaway portions 9 of the ball sockets and by this means either piston 2 may be inserted in a cylinder first, and the other piston follows into the other cylinder, so that the pistons are successively inserted in the cylinders longitudinally after the connecting rods have been assembled in the pistons and on the same crank pin.

In the modification of the invention shown in Figure 3, the clearances are such that both pistons 10 may be started longitudinally into the cylinders 18 at substantially the same time or simultaneously inserted. Provision for such assembly is afforded by beveling the rims of the pistons as shown at the points 11 so that when these two bevels are placed together, the angle between the connecting rods 3 is less than the angle between the axes of the cylinders 18 and the pistons may be simultaneously inserted in the cylinders. As in Figure 1 the balls 13 on the connecting rods are pivotally held within the sockets 14 in the portions 12 of the pistons 10, which permits the connecting rods to rock relatively to the pistons.

I am not to be understood as limiting the invention to the exact form and construction shown as equivalent constructions may be devised within the scope of my claims.

I claim:

1. A multiple cylinder V-type fluid pressure motor, having a crank shaft and crank, cylinders located at equal acute angles on opposite sides of a plane passing through the axis of the crank shaft, pistons adapted to operate in the cylinders, connecting rods pivotally connected to said pistons and adapted to be assembled on the same crank pin before inserting the pistons into the cylinders, and means permitting said pistons to be inserted in the cylinders longitudinally after the connecting rods have first been assembled in the pistons and on the crank pin.

2. A multiple cylinder V-type fluid pressure motor, having a crank shaft and crank, cylinders located at equal acute angles on opposite sides of a plane passing through the axis of the crank shaft, pistons adapted to operate in the cylinders, connecting rods pivotally connected to said pistons and adapted to be assembled on the same crank pin before inserting the pistons into the cylinders, and means for adjusting the connecting rods at an angle less than the angle between the axes of the cylinders, to permit the pistons to be inserted in the cylinders longitudinally after the connecting rods have been assembled in the pistons and on the said crank pin.

3. A multiple cylinder V-type fluid pressure motor, having a crank shaft and crank, cylinders located at equal acute angles on opposite sides of a plane passing through the axis of the crank shaft, pistons adapted to operate in the cylinders, connecting rods pivotally connected to said pistons and adapted to be assembled on the same crank pin before inserting the pistons into the cylinders, and means permitting said pistons to be successively inserted in the cylinders longitudinally after the connecting rods have first been assembled in the pistons and on the crank pin.

4. A multiple cylinder V-type fluid pressure motor, having a crank shaft and crank, cylinders located at equal acute angles on opposite sides of a plane passing through the axis of the crank shaft, pistons adapted to operate in the cylinders, connecting rods pivotally connected to said pistons and adapted to be assembled on the same crank pin before inserting the pistons into the cylinders, and means for adjusting the connecting rods at an angle less than the angle between the axes of the cylinders, to permit the pistons to be successively inserted in the cylinders longitudinally after the connecting rods have been assembled in the pistons and on the said crank pin.

In testimony whereof I have signed this specification.

ROBERT A. LUNDELL.